Jan. 2, 1940.   J. E. COCHRAN   2,185,330
COOLING SYSTEM FOR REFRIGERATORS
Filed July 7, 1937
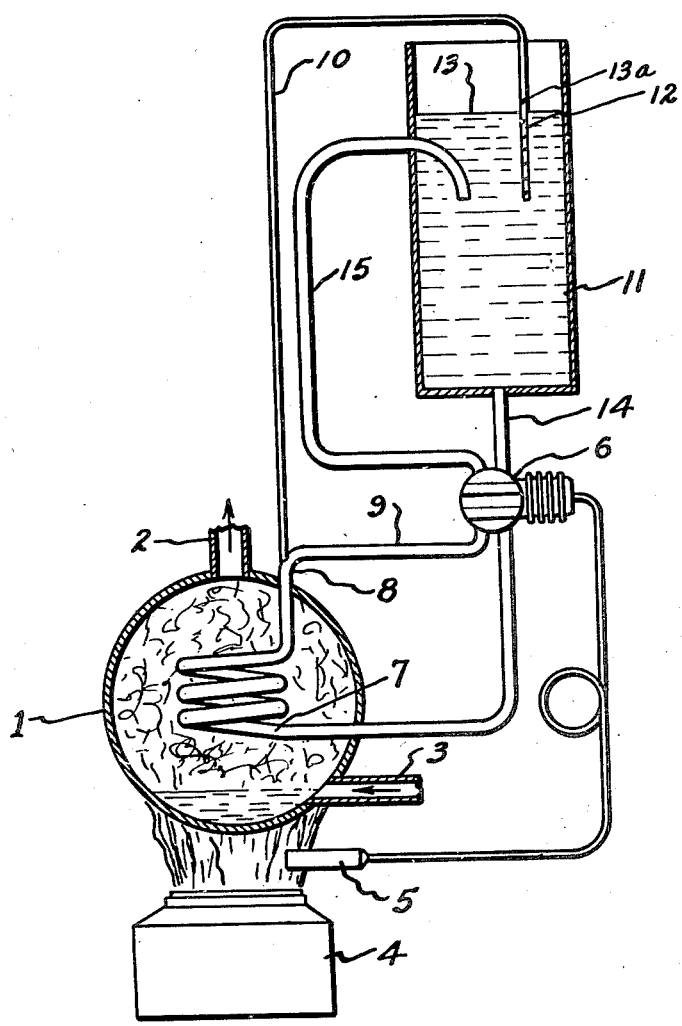
INVENTOR.
JOHN E. COCHRAN.
BY
ATTORNEYS Patented Jan. 2, 1940

2,185,330

UNITED STATES PATENT OFFICE 2,185,330

COOLING SYSTEM FOR REFRIGERATORS

John E. Cochran, Cincinnati, Ohio, assignor to The Crosley Corporation, Cincinnati, Ohio, a corporation of Ohio Application July 7, 1937, Serial No. 152,397

3 Claims. (Cl. 62—5)

My invention relates to cooling systems for refrigerators and particularly to a cooling system for a refrigerator of the intermittent absorption type wherein a generator absorber is cooled by circulating water.

In intermittent absorption refrigeration systems, it has been customary in the past, to utilize a single vessel which, during the heating cycle, acts as a generator or boiler. After the heating cycle is ended, the generator vessel becomes, during the period of evaporation and cooling, an absorber. With such a single vessel it has been customary to supply a solution of liquid refrigerant, such as ammonia, and water from which the refrigerant is boiled off, condensed, and liquefied to liquid ammonia. The condensed liquefied refrigerant, when it expands, takes up the heat from the freezing compartment. The expanded ammonia then returns to the weak solution in the generator absorber where it is dissolved in the weak solution preparatory to the next heating cycle.

Various cooling systems have been arranged wherein a cooling coil passes through the generator absorber and water is caused to flow through the coil during the cycles of absorption. This is necessary as the hot weak liquor will not otherwise absorb an adequate quantity of refrigerant. Such cooling systems have ordinarily depended on a fresh supply of cooling water which severely limits the availability and convenience of utilizing an intermittent absorption system.

Difficulty has further been experienced in positioning coils within a generator absorber, which during the heating cycle, when the gaseous ammonia is being boiled off, and the temperature becomes sufficiently high to cause the water in the cooling coil to form steam, do not cause a hammering of steam pockets in the cooling system.

It is the object of my invention to provide a thermo-syphon water cooling system in combination with the generator absorber of an intermittent absorption type of refrigerator which is entirely automatic in operation and which is so constructed and arranged that any steam formed in the coil will be condensed and returned to the cooling water tank without causing knocking in the pipe or the formation of pressure which either bursts the pipe or interferes with an even flow of cooling water during the absorption cycle.

A further object of my invention is the provision of a water supply vessel so arranged with respect to the generator absorber that a fresh supply of cooling water is not required to permit the apparatus to function properly in a series of generating and evaporating cycles.

A further object is to provide a simple, safe, thermostatically controlled method of cooling the weak liquor within the generator absorber at the end of a generating cycle.

Another object is the provision of a cooling system for a generator absorber which will be effectively cut out during the generating stage so as not to interfere with rapid generation.

The above objects and other objects to which reference will be made in the ensuing description I accomplish by that certain combination and arrangement of parts of which I have illustrated diagrammatically a preferred embodiment.

Referring to the drawing, the figure represents a diagram of one modification of my proposed cooling system.

At 1, I have illustrated conventionally a generator absorber which in accordance with usual practice is a pressure type vessel having an outlet 2, through which the refrigerant vapors pass during the generating cycle and an inlet 3, through which the expanded gases return after the generation cycle has taken place.

At 4, there is indicated a heating element which may be used with gas or oil or which may be electrically operated.

At 5, I have illustrated diagrammatically a thermostat which is so connected in the well known manner in the path of heated gases from the burner as to cause the shutting off of the duplex valve 6 during the generation cycle, and so that a circulation of cooling water will neither heat up the entire reservoir of cooling water or delay rapid generation.

A tubular coil 7 is illustrated which passes through the walls of the generator absorber, there being no flat places in the coil to interfere with continuous circulation therein.

Water after passing through the coil 7 comes out the outlet pipe 8 which, as indicated, is by-passed, one branch 9 passing to the duplex valve 6 and the other branch 10 comprising a steam vent pipe which extends up over the cooling water reservoir 11 and passes down through the top wall of the reservoir 11. The steam vent pipe is preferably provided with a discharge nozzle 12, having a series of small openings such as 1/32 of an inch, arranged in the nozzle below the normal level of the water in the reservoir. The level of water in the reservoir is indicated at 13.

The reservoir may be open topped and the nozzle may be provided with a vent orifice 13a which prevents building up steam pressure. The discharge from the water reservoir 11 to the coil 7 is through a pipe or tube which passes to the compound valve 6 so that when the valve 6 is closed the discharge from the coil to the reservoir will also be closed.

At 15, I have illustrated the pipe or tube which extends from the valve 6 through which water emerges from the coil 7 and circulates through the tank 11.

At the end of the generating cycle after the liquid ammonia has been condensed and is ready to be expanded, water passes from the reservoir 11 down through the pipe 14 through the valve 6 into the coil 7 out through the pipe 8, and 9 through the valve 6 up the pipe 15 and back into the reservoir. When the boiler 1 is not on the generation cycle the compound valve 6 is open, permitting a free thermo-syphon circulation of water from the water reservoir or tank 11 through the coil 7.

During the heating cycle after the refrigerant has been reabsorbed in the weak liquor in the generator absorber, the burner 4 is caused to generate heat either by ignition through a pilot or otherwise. During this cycle the pressure builds up to possibly 250 to 280 lbs. per sq. inch and the temperature of the liquid in the generator absorber may reach 275° to 325° F. The thermostat 5 is effected at the start of the generating cycle and it causes the closure of the duplex valve 6 so that water cannot circulate through the pipe 9 and 15 or through the pipe 14. At the start of this heating cycle the coil 7 is filled with water, and as soon as any substantial quantity of ammonia vapor has been boiled off the temperature of the weak liquor in the generator absorber 1 is elevated above the boiling point of water. At this stage of the operation since the valve 6 is closed, steam forms within the coil 7 and were no other outlet provided, it would burst the coil 7. I have provided, however, the by-pass 10 preferably of reduced diameter through which the steam formed in the coil 7 passes up through the pipe 10 and down through the nozzle 12 where, in passing out through the small holes in the nozzle, the steam is condensed in the water within the reservoir 11. The small orifices breaks up the flow of steam and prevents the development of any water hammering noises.

During the boiling cycle while steam is passing through the pipe 10 and is being condensed in the reservoir 11 the hot water tends to remain at the top of the tank. There is no circulation within the tank and at the end of the heating cycle when the burner 4 is shut off water which tends to be as cool as any within the reservoir 11 immediately starts to flow down through the pipe 14 into the coil 7 so that rapid cooling takes place almost immediately.

Water continues to circulate through the coil 7 back into the reservoir 11 until the liquid within the generator absorber has been cooled to such a point that it will readily re-absorb the expanded refrigerant gases. I have referred to the refrigerant employed in the system described, as ammonia, but it will be understood that other types of refrigerant effective in an intermittent absorption system may be employed.

It will further be obvious that the cooling system which I have shown in combination with one particular type of intermittent absorption system will be equally effective for cooling purposes in other apparatus wherein during certain cycles of operation there is sufficient heat affecting the cooling coils to cause the generation of steam, and during other cycles it is desired to cause a circulation of cooling water through the coil without interruption.

In the event that the water valves stick or become clogged up either open or closed, there is no danger. The defective refrigeration would immediately suggest that the cooling system was not operating properly. The coil 7 is shown within the generator absorber. It may be formed instead as a jacket either within or surrounding the generator absorber. The coil illustrated forms a convenient heat transferring device which permits the heat of the hot weak liquor at the end of the generating cycle to be transferred to the cooling medium, in this instance water, which reduces the temperature of the weak liquor so that it will readily absorb the gases expanded during the expansion cycle.

Having thus described my invention, what I claim as new and desire to secure by Letters Patent is:

1. A water cooling system for a refrigerator of the intermittent absorption type having a generator absorber containing a cooling coil which has its normal inlet and outlet closed during the heating cycle only, a water supply reservoir, the bottom of which is above the level of the top of the generator absorber, a tube extending from the reservoir to the inlet at the bottom of said coil, a tube extending from the outlet of said coil to the reservoir and connected thereto above the bottom thereof, and means for venting steam formed in said coil and for condensing said steam comprising a branch tube extending from said last noted tube and having a discharge nozzle extending below the normal water level in said reservoir.

2. In combination with a thermo-syphon water cooling system in a refrigerator of the intermittent absorption type in which water circulates through a heat transferring device consisting of a coil associated with a generator absorber, a supply of water, means for cutting off the circulation of water in said heat transferring device during generating cycles, and means for exhausting and condensing steam formed in said coil during the generating cycles, comprising a tube extending from said coil and having the discharge end of said tube immersed in said water supply.

3. In combination with a thermo-syphon water cooling system in a refrigerator of the intermittent absorption type having a generator absorber and a water reservoir, means for establishing a flow of cooling water through a coil in the generator absorber during evaporation cycles, means for inhibiting the flow of cooling water from said water reservoir during generating cycles, and means for venting steam formed in said coil during cycles of generation, said means comprising a vent tube extending from said coil and having the discharge end of said tube immersed in the water of the reservoir of said cooling system.

JOHN E. COCHRAN.